United States Patent [19]

Gilbert

[11] Patent Number: 4,839,420

[45] Date of Patent: Jun. 13, 1989

[54] PREPARATION OF POLYVINYLAZIDES FROM POLYVINYLNITRATE

[75] Inventor: Everett E. Gilbert, Morristown, N.J.

[73] Assignee: The United States of America as represented by the Secretary of the Army, Washington, D.C.

[21] Appl. No.: 600,869

[22] Filed: Apr. 16, 1984

[51] Int. Cl.$^4$ .................................................. C08F 8/30
[52] U.S. Cl. .................................... 525/61; 149/19.91; 525/330.5; 525/367
[58] Field of Search ............... 525/328.2, 328.8, 326.7, 525/61, 56, 330.5, 367; 149/19.1, 19.91

[56] References Cited

U.S. PATENT DOCUMENTS

| | | | |
|---|---|---|---|
| H103 | 8/1986 | Gilbert | 525/331.5 |
| H272 | 5/1987 | Gilbert | 525/328.8 |
| 3,401,156 | 9/1968 | Lovett et al. | 525/328.2 |
| 3,965,081 | 6/1976 | Strecker et al. | 149/19.91 |
| 4,098,193 | 7/1978 | Schroeder | 102/92 |
| 4,279,672 | 7/1981 | Lenevew et al. | 149/19.91 |
| 4,288,262 | 9/1981 | Flanagan et al. | 149/19.1 |
| 4,440,687 | 4/1984 | Witucki et al. | 149/19.1 |
| 4,450,110 | 5/1984 | Simmons et al. | 260/349 |
| 4,483,978 | 11/1984 | Monser | 260/349 |

FOREIGN PATENT DOCUMENTS 911759  7/1946  France .................................. 149/88

OTHER PUBLICATIONS

Meyer, *Explosives*, p. 221, Verlag Chemie (1977), New York.

*Primary Examiner*—Edward A. Miller
*Attorney, Agent, or Firm*—Robert P. Gibson; Edward Goldberg; Edward F. Costigan

[57] ABSTRACT

Polyvinylazidonitrate and a process of making the same by reacting polyvinylnitrate with sodium or lithium azide in selected solvents.

10 Claims, No Drawings

PREPARATION OF POLYVINYLAZIDES FROM POLYVINYLNITRATE

GOVERNMENT RIGHTS

The invention described herein may be manufactured, used and licensed by the Government for Governmental purposes without the payment to me of any royalties thereon.

BACKGROUND OF THE INVENTION

Energetic compounds having a high nitrogen content are employed as ingredients of solid propellants for guns and rockets. Such compounds do not contribute to smoke and flash and their main combustion product is nitrogen, an extremely stable molecule showing little tendency to react even at the high temperatures generated in gun tubes. Propellant compounds, which yield combustion products rich in nitrogen, are further advantageous in that they cause less gun erosion than compounds giving the same flame temperature but of lower nitrogen content.

Compounds of high nitrogen content can be produced by introduction of the azide group into the molecule. Azide compounds are of interest, since they (1) provide good impetus, (2) yield low flame temperatures, (3) produce less flash, (4) accelerate the burn rate, and (5) can possess good thermal and chemical stability.

SUMMARY AND DETAILED DESCRIPTION OF THE INVENTION

The present invention is directed to the preparation of polyvinylazides, particularly polyvinylazidonitrates, i.e. vinyl polymers containing both azide ($-N_3$) and nitrate ($-ONO_2$) groups, which are useful as propellants for guns, rockets and the like. It is believed that polyvinylazidonitrates are novel although polymers containing only azide groups, e.g. glycerylazide polymer, and only nitrate groups, e.g. polyvinylnitrate, are well known as gun propellants.

The novel polyvinylazides can be prepared by reacting polyvinylnitrate with a metallic azide in a solvent for the polyvinylnitrate and the metal azide at a temperature and for a period of time sufficient to effect replacement of a nitrate group by an azide group.

The degree of substitution of the nitrate groups by azide groups can vary from about 5 to about 95%, and is determined by the stoichiometry, as well as by the time and temperature of reaction. Suitable metal azides are preferably alkali metal azides, e.g. sodium, potassium and lithium azide, and alkaline earth metal azides, such as calcium, magnesium and barium azides, although any stable metal azide can be employed in the process of the present invention.

The reaction is carried out in a solvent in which the polyvinylnitrate or the metal azide or both are soluble. Suitable solvents include dimethyl formamide (DMF), dimethylsulfoxide (DMSO), N-methylpyrrolidinone (NMP), acetone and 2-methoxyethanol. The preferred solvent is DMF, particularly with sodium azide, even though the sodium azide is only slightly soluble in DMF (about 0.5g/100 ml DMF at 155° C.), although a higher reaction rate is obtained with lithium azide apparently because of its much higher solubility in DMF.

The reaction is preferably carried out at a temperature not substantially exceeding 80° C. to avoid crosslinking of the polymeric azides and the production of crosslinked products, which are insoluble in solvents such as acetone. Both crosslinked and non-crosslinked products are suitable for use as energetic materials; however, the non-crosslinked products are preferred, since they are soluble in solvents such as acetone and can be employed to make solutions wih other materials such as nitrocellulose. Thus, in a series of six reactions each of seven hours duration carried out at temperatures ranging from 50° C. to 95° C. the products obtained at temperatures from 50° C. to 75° C. were all soluble in acetone, whereas at 85° C. 5% of the product was insoluble in acetone and at 95° C. over 50% of the product obtained was insoluble in acetone. When the reaction was carried out at 65° C. for a much longer period of 118 hours, the reaction product was still completely soluble in acetone.

Solvents also vary in their influence on the production of crosslinked reaction products. For example, considerable crosslinking resulted when polyvinylnitrate was reacted with sodium azide in DMSO at room temperature after 72 hours, whereas no crosslinking resulted when the reaction was carried out in DMF at 65° C. for 118 hours. Further, the method of isolation of the solid reaction product can influence crosslinking. For example, in experiments described and tabulated below, if the solid reaction product, after trituration with methanol, is dissolved in acetone shortly after preparation, e.g. within six hours, it remains in solution indefinitely. However, if the solid reaction product is held for a longer period, e.g. twelve hours, it becomes crosslinked and completely insoluble in acetone.

The following examples illustrate specific embodiments of the novel polyvinylazidonitrate propellants and method for producing same according to the process of the present invention.

EXAMPLE A

Polyvinyl nitrate (containing a minimum of 14.7% nitrogen, corresponding to 93.5% of the total possible nitrate groups) (1.0 g) was mixed with sodium azide (2.0 g) in dimethyl sulfoxide (25 ml.). The mixture was stirred at room temperature for 47 hours, and then poured into water. The resulting gummy solid was thoroughly triturated with water, then with methanol and dried, yielding 1.0 g. of product. An analysis of the product revealed a nitrogen content of 33.1%, and the infrared spectrum showed the present of both azide and nitrate groups.

EXAMPLE B

Polyvinylnitrate of the type employed in example 1 (1.0g) was heated with sodium azide (1.0 g) in dimethylformamide (25 ml) at 60° C. for 3 hours. The reaction mixture was worked up as described in example 1, yielding 1.0 g of a rubbery solid containing 33.9% nitrogen.

Table 1 sets forth the reaction conditions and results of experiments made using the same polyvinylnitrate starting material as in example 1. The reaction products and course of the reaction were identified by elemental analysis and infrared spectra.

TABLE 1

| Example No. | Reagents PVN | Reagents NaN₃ | Solvent Name | Solvent Ml. | °C. | Hrs. | Grms. Yld. | Analysis C | Analysis H | Analysis N | Total | Remarks |
|---|---|---|---|---|---|---|---|---|---|---|---|---|
| 1 | 1.0 | 1.0 | DMSO | 25 | 25 | 22 | 0.9 | — | — | — | — | |
| 2 | " | " | DMF | " | 60 | 3 | 1.0 | — | — | 33.9 | — | |
| 3 | " | " | DMSO | " | 25 | 46 | " | — | — | 32.3 | — | |
| 4 | " | " | " | " | " | 97 | 1.6 | — | — | — | — | Insolubles noted after 72 hrs. |
| 5 | " | 0.5 | " | " | " | 46 | 2.1 | — | — | 22.3 | — | |
| 6 | " | 2.0 | " | " | " | 47 | 1.0 | — | — | 33.1 | — | |
| 7 | 1.1 | 1.0(1) | Acetone | " | " | 56 | 9.5 | " | — | — | — | — |
| 8 | " | 1.0(1) | N—CH₃ Pyrr. | " | 25 | 46.5 | 1.2 | — | — | — | — | |
| 9 | " | 1.0 | Acetone | " | " | 56 | 24 | 1.4 | — | — | — | — |
| 10 | " | " | DMF | " | 60 | 3 | 1.0 | — | — | — | — | |
| 11 | " | "(1) | N—CH₃ Pyrr. | " | 25 | 96 | 0.9 | — | — | — | — | |
| 12 | 1.0 | " | DMF | " | 50 | 5 | " | — | — | — | — | |
| 13 | 6.0 | 6.0 | " | 150 | " | 5 | " | — | — | — | — | |
| 14 | 1.1 | 1.0 | " | 25 | " | 7.5 | 0.9 | 36.9 | 4.5 | 39.8 | 79.3 | |
| 15 | 1.0 | " | (2) | " | " | " | — | — | — | — | — | |
| 16 | 1.1 | " | DMF | " | " | 16 | 0.9 | — | — | — | — | |
| 17 | " | " | " | " | " | 24 | 1.0 | — | — | — | — | |
| 18 | " | 2.0 | " | " | " | 48 | 0.9 | 38.8 | 4.5 | 43.8 | 87.1 | |
| 19 | " | " | " | " | " | 120 | 0.9 | " | " | " | " | |
| 20 | 4.8 | 6.0 | " | 100 | " | 48 | 3.2 | 38.8 | 4.8 | 43.9 | 87.5 | |
| 21 | 1.1 | 1.0 | " | 25 | 65 | 9 | 0.9 | — | — | — | — | |
| 22 | " | " | " | " | " | 24 | " | — | — | — | — | |
| 23 | " | " | " | " | " | 47 | 1.1 | 39.0 | 4.5 | 50.4 | 93.9 | |
| 24 | " | " | " | " | " | 118 | 1.5 | 39.2 | 4.6 | 50.6 | 94.4 | |
| 25 | 5.3 | 5.0 | " | 125 | " | 47 | 5.4 | 39.9 | 4.5 | 48.8 | 93.2 | (4) |
| 26 | 5.5 | 5.0 | " | 125 | " | 47 | 5.6 | — | — | — | — | (4) |
| 27 | 5.5 | 5.0 | " | " | " | 47 | 5.9(5) | — | — | — | — | (4) |
| 28 | 1.1 | 1.0 | " | 25 | " | 24 | 0.9(5) | 39.1 | 4.7 | 50.7 | 94.5 | |
| 29 | " | " | " | " | " | 7 | 1.0(5) | 38.4 | 4.7 | 49.6 | 92.7 | |
| 30 | " | " | " | " | " | 15 | 1.0(5) | 39.0 | 4.4 | 49.1 | 92.5 | |
| 31 | " | " | " | " | 75 | 7 | 0.7 | — | — | — | — | |
| 32 | " | " | " | " | 85 | " | — | 40.8 | 4.7 | 48.4 | 93.9 | |
| 33 | " | " | " | " | 95 | " | — | — | — | — | — | |
| 34 | 11.0 | 10.0 | " | 200 | 65 | 24 | 7.3 | — | — | — | — | |
| 35 | 1.1 | 1.0(1) | DMF | 25 | 65 | 24 | — | — | — | — | — | |
| 36 | 11.0 | 10.0 | " | 200 | 55 | 6 | 8.2 | 34.5 | 4.6 | 38.9 | 78.0 | |
| 37 | 5.5 | 5.0 | " | 100 | 50 | 6 | 6.3(5) | 34.5 | 4.2 | 37.0 | 75.7 | |
| 38 | 1.1 | 1.5(1) | " | 25 | 80 | 164 | 0.7 | 41.5 | 4.5 | 48.1 | 94.1 | |
| 39 | 0.5 | 0.5 | DMSO | 20 | 25 | 162 | — | — | — | — | — | |
| 40 | 1.1 | 2.0 | DMF | 25 | 50 | 161 | 0.7 | 39.2 | 4.4 | 50.7 | 94.3 | |
| 41 | " | 0.8(1) | " | " | 55 | 3 | — | — | — | 35.8 | — | |

NOTES:
(1) Lithium azide used in place of sodium azide.
(2) 2-Methoxyethanol used as solvent.
(3) Analysis on combined experiments 25, 26, 27 given under Run 25.
(5) Undried product.

Elemental analysis (see Table 1) shows that the reaction at fairly short periods of time is accompanied by olefin formation as well as replacement of a nitrate group by an azide group, as shown in Table 2.

TABLE 2

| Example No. | °C. | Hours | Structure (1) X | Structure (1) Y | Structure (1) Z | | Analysis C | Analysis H | Analysis N |
|---|---|---|---|---|---|---|---|---|---|
| 14 | 50 | 7 | 55 | 27 | 18 | Calc. | 36.0 | 4.2 | 40.3 |
|    |    |   |    |    |    | Fd.   | 36.9 | 4.5 | 39.8 |
| 36 | 55 | 7 | 54 | 31 | 15 | Calc. | 35.0 | 4.2 | 39.3 |
|    |    |   |    |    |    | Fd.   | 34.5 | 4.6 | 38.9 |
| 29 | 65 | 7 | 70 | 10 | 20 | Calc. | 38.6 | 4.5 | 49.5 |
|    |    |   |    |    |    | Fd.   | 38.4 | 4.7 | 49.6 |

(1) Mole percent based on the following structure:
$(CH_2CHN_3)_x (CH_2CHONO_2)_y (CH=CH)_z$ Additional evidence of double bond formation was obtained by bromination of the products. Analysis of the brominated product showed a bromine uptake corresponding closely to the degree of unsaturation indicated by analysis of the unbrominated product.

Longer reaction periods yield products containing no nitrate groups, as shown by infrared analysis. However, the total content of C, H and N never exceeded approximateely 95%. The difference is accounted for by the uptake of atmospheric oxygen, as shown by a broad infrared peak at 3400 cm⁻¹ corresponding to the hydroxyl group. A maximum of about 51% nitrogen was attained, corresponding to about 83% of that theoretically present in pure polyvinylazide.

What is claimed is:

1. A process of producing a polyvinylazide optionally containing nitrate groups, which comprises reacting a polyvinylnitrate with a metal azide in the presence of an inert organic solvent for at least one of the metal azide and polyvinylnitrate reactants at a temperature and for a time sufficient to effect replacement of a nitrate group by an azide group.

2. A process according to claim 1, wherein the reaction temperature is between about 20° C. and 80° C.

3. A process according to claim 1, wherein the azide is sodium azide.

4. A process according to claim 1, wherein the azide in lithium azide.

5. A process according to claim 1, wherein the solvent is selected from the group consisting of dimethyl formamide, N-methylpyrrolidinone, dimethyl sulfoxide, acetone and 2-methoxyethanol, and mixtures thereof.

6. A process according to claim 1, wherein the solvent is dimethyl formamide.

7. A process according to claim 6, wherein the azide is sodium azide.

8. A process according to claim 1, wherein the polyvinylazide produced contains nitrate groups.

9. A process according to claim 1, wherein the polyvinylazide produced is soluble in acetone.

10. A process according to claim 1, wherein the polyvinylazide produced is insoluble in acetone.

* * * * *